United States Patent [19]

Fukui et al.

[11] 4,146,591
[45] Mar. 27, 1979

[54] PROCESS FOR PRODUCING 4-METHYL-1-PENTENE COPOLYMER COMPOSITION

[75] Inventors: Kunisuke Fukui, Ohtake; Ikuo Hirai, Iwakuni, both of Japan

[73] Assignee: Mitsui Petrochemical Industries Ltd., Tokyo, Japan

[21] Appl. No.: 901,714

[22] Filed: May 1, 1978

[51] Int. Cl.$^2$ ............................................. C08L 23/20
[52] U.S. Cl. ........................... 260/878 B; 260/897 A
[58] Field of Search ......................... 260/878 B, 897 A

[56] References Cited

U.S. PATENT DOCUMENTS

| | | | |
|---|---|---|---|
| 3,405,108 | 10/1968 | Clark | 260/88.2 |
| 3,692,712 | 9/1972 | Crouch et al. | 260/878 |

*Primary Examiner*—Carman J. Seccuro
*Attorney, Agent, or Firm*—Sherman & Shalloway

[57] ABSTRACT

A process for producing a 4-methyl-1-pentene copolymer composition by sequential polymerization, which comprises

[I] a step of polymerizing 4-methyl-1-pentene in the presence or absence of a minor amount of a $C_6$-$C_{18}$ linear 1-olefin in a hydrocarbon liquid medium in the presence of a catalyst comprising a transition metal compound and an organometallic compound of a metal of Groups I to III of the periodic table to form reaction product containing a 4-methyl-1-pentene polymer or copolymer (A) having a 4-methyl-1-pentene content of at least about 90% by weight; and

[II] a step of further copolymerizing 4-methyl-1-pentene, 1-hexane and a $C_7$-$C_{10}$ linear 1-olefin in the presence of the reaction product containing the polymer or copolymer (A) to form a rubbery copolymer (B) having a 4-methyl-1-pentene content of about 30 to about 70% by weight, a 1-hexene content of about 10 to about 60 and a $C_7$-$C_{10}$ linear 1-olefin content of about 10 to about 60% by weight, the content of the copolymer (B) being about 5 to about 20% by weight based on the total weight of the polymer or copolymer (A) and the copolymer (B).

4 Claims, No Drawings

PROCESS FOR PRODUCING 4-METHYL-1-PENTENE COPOLYMER COMPOSITION

This invention relates to a process for producing a 4-methyl-1-pentene copolymer composition by an industrially easy operation with a good quality reproducibility, which can lead to the improvement of the impact strength of the copolymer of 4-methyl-1-pentene without substantially deteriorating its desirable properties such as light weight and transparency and which can eliminate the trouble of whitening and delamination at the time of bending or impact.

4-Methyl-1-pentene polymers have satisfactory light weight and transparency, but because of their insufficient impact strength, their use has been limited in many ways.

Japanese Patent Publication No. 22077/75 (corresponding to British Pat. No. 1,001,801) discloses a solid transparent copolymer of 4-methyl-1-pentene with a minor proportion of a linear 1-olefin having from 5 to 18 carbon atom which has a high clarity and a low haze and is optically superior, and also a process for its production. This Patent Publication states that to prepare the transparent copolymer with the highest possible clarity and the lowest possible haze, by the process of this Publication comprising copolymerizing the 4-methyl-1-pentene and the linear 1-olefin in the presence of a stereospecific catalyst, two things are essential: that a high proportion of the catalyst residues should be removed from the polymer produced, and that the polymer should not be allowed to come into contact with water until the catalyst removal process is at an end. It is stated also in this patent publication that the copolymer is meant to include products of both random and sequential polymerizations, and that such sequential copolymerization may be carried out by polymerizing 4-methyl-1-pentene while passing in the second monomer for one or more controlled periods, such periods being at spaced intervals.

This patent publication referes to sequential copolymerization as well as random copolymerization, but all of the Examples cover random copolymerization, and sequential copolymerization is not shown at all. Furthermore, the patent publication contemplates the improvement of the optical properties of the copolymer, and no specific suggestion is made as to the improvement of impact strength. In fact, scarcely any improvement in impact strength is observed in a random copolymer of 4-methyl-1-pentene and a linear 1-olefin having more than 5 carbon atoms as compared with a homopolymer of 4-methyl-1-pentene.

Another suggestions is made in British Pat. No. 1,093,344. This Patent discloses a process which comprises initially copolymerizing a branched chain 1-olefin such as 4-methyl-1-pentene with a linear 1-olefin such as 1-hexene to form a first living polymer (which means a polymer the chains of which are still capable of growth), and subsequently polymerizing further branched chain 1-olefin such as 4-methyl-1-pentene to form a block copolymer, both polymerization stages being effected in the presence of a catalyst such as titanium trichloride and diethylaluminum chloride.

This patent states that in general, the above copolymer possesses higher impact strength, greater flexibility and, in many cases, lower brittle point than a homopolymer of the branched chain 1-olefin, and it is recommended that the polymerization be carried out in a hydrocarbon liquid medium such as heptane.

According to this process, a rubbery copolymer of 4-methyl-1-pentene and 1-hexene for example is first formed, and 4-methyl-1-pentene is further polymerized in the presence of the reaction product containing the above copolymer. When the rubbery copolymer is formed in the first stage, a greater portion of this copolymer dissolves in the reaction medium. Thus, if only the slurry component is recovered after the polymerization, the impact strength of the resulting polymer is scarcely improved. A copolymer composition having improved impact strength can only be obtained by recovering both the polymer insoluble in the reaction medium and the polymer soluble in the reaction medium and combining them. However, since a greater portion of the rubbery copolymer dissolves in the solvent, the viscosity of the polymer solution inconveniently increases to make the polymerization operation difficult. Hence, the aforesaid recovery process is complicated and is economically disadvantageous. In addition, shaped articles prepared from such a copolymer cannot be free from whitening or delamination.

As still another suggestion, British Pat. No. 1,095,303 discloses a composition comprising a minor proportion of a rubbery copolymer of 4-methyl-1-pentene and a linear 1-olefin with a view to increasing the impact strength of a homopolymer of 4-methyl-1-pentene without substantially sacrificing its tensile strength and transparency. Such a blend is unsuitable for providing a homogeneous composition with a good reproducibility of quality, and cannot easily afford a homogeneous composition such as a product of sequential polymerization. Furthermore, shaped articles prepared from such a blend cannot be free from the trouble of whitening.

The present inventors have made investigations in an attempt to provide a 4-methyl-1-pentene copolymer composition which is free from the disadvantages of the prior art techniques mentioned above and has improved impact strength without a substantial deterioration in the desirable properties of poly 4-methyl-1-pentene such as light weight and transparency and which also overcomes the trouble of whitening and delamination at the time of bending or impact associated with the prior art techniques.

These investigations have led to the discovery that a 4-methyl-1-pentene copolymer composition having light weight, transparency, high-impact strength, resistance to whitening and resistance to delamination can be provided by an easy operation with a good reproduciblity of quality by a process which comprises [I] a step of forming a reaction product containing (A) poly 4-methyl-1-pentene or a copolymer of 4-methyl-1-pentene with a minor amount of a $C_6$-$C_{18}$ linear 1-olefin with a 4-methyl-1-pentene content of at least about 90% by weight, and [II] a sequential copolymerizing step of further copolymerizing 4-methyl-1-pentene, 1-hexene and a $C_7$-$C_{10}$ linear 1-olefin in the presence of the reaction product in the previous step to form (B) a rubbery copolymer containing these three monomers in amounts of about 30 to about 70% by weight, about 10% to about 60% by weight, and about 10 to about 60% by weight respectively, the proportion of the rubber copolymer (B) being about 5 to about 20% by weight based on the total weight of (A) and (B).

It is an object of this invention to provide a process for producing a 4-methyl-1-pentene copolymer composition having the aforesaid improved properties.

The above and other objects and advantages of the present invention will become more apparent from the following description.

In step [I] of the present invention, 4-methyl-1-pentene is polymerized in the presence or absence of a minor amount of a $C_6$–$C_{18}$ linear 1-olefin to form a reaction product which contains (A) a polymer or copolymer of 4-methyl-1-pentene with a 4-methyl-1-pentene content of at least about 90% by weight. The reaction is carried out in a hydrocarbon liquid medium in the presence of a catalyst composed of a transition metal compound and an organometallic compound of a metal of Groups I to III of the periodic table.

A stereospecific catalyst of the above combination can be used in the present invention. Suitable transition metal compounds include, for example, titanium halide compounds having the general formula $TiX_3$ (X is a halogen atom) or $TiX_3 \cdot \frac{1}{3} AlX_3$, such as $TiCl_3$ or $TiCl_3 \cdot \frac{1}{3} AlCl_3$ which is obtained by reducing titanium tetracholoride with a member selected from hydrogen, aluminum, titanium and organoaluminum compounds. Complexes at least containing titanium, magnesium and halogen, for example, a titanium halide supported on a halogen-containing magnesium compound, can also be used.

The preparation of these catalysts is known, and for example, highly active catalysts comprising the latter-mentioned complexes at least containing titanium, magnesium and halogen are disclosed in detail in, for example, Japanese Patent Publication No. 36786/77 (published on Sept. 17, 1977), Japanese Patent Publication No. 36913/77 (published on Sept. 17, 1977), Japanese Laid-Open Patent Publication No. 126590/75 (laid open on Oct. 4, 1975), Japanese Laid-Open Patent Publication No. 28189/76 (laid open on Mar. 9, 1976), Japanese Laid-Open Patent Publication No. 92885/76 (laid open on Aug. 14, 1976), Japanese Laid-Open Patent Publication No. 127185/76 (laid open on Nov. 5, 1976), Japanese Laid-Open Patent Publication No. 136625/76 (Nov. 26, 1976), Japanese Laid-Open Patent Publication No. 87489/77 (laid open on July 21, 1977), West German Patent Publication No. 2643143 (laid open on June 2, 1977), West German Patent Publication No. 2656055 (laid open on June 23, 1977), and West German Patent Publication No. 2708588 (laid open on Sept. 8, 1977). Preferably, such catalysts have a specific surface area of at least 100 $m^2/g$. When complexes containing at least titanium, magnesium and halogen are used as the transition metal compound, it is preferred to use an electron donor conjointly. Examples of the electron donor are organic acid esters such as aromatic carboxylic acid esters, alkyl-containing ethers, and organic acid anhydrides. The electron donor is effectively used by including a part or the whole of the electron donor in the complex at least containing titanium, magnesium and halogen, and the remainder is added to the polymerization system; or by contacting it with the organometallic compound in advance.

Suitable organometallic compounds are organoaluminum compounds, preferably alkylaluminum compounds of the general formula $R_{3-n}AlX_n$ in which R is an alkyl group, X is a hydrogen or halogen atom, and n is 0 to 2. Specific examples of the alkylaluminum compounds include trialkyl aluminums, dialkylaluminum halides, alkylaluminum sesquihalides and disalkylaluminum hydrides in which the alkyl groups have 1 to 10 carbon atoms. Chlorine, bromine and iodine are examples of the halogen in the above halides.

The reaction is carried out in a hydrocarbon liquid medium. Suitable liquid media are those in which at least about 90% by weight of a homo- or copolymer having a 4-methyl-1-pentene content is insoluble. Specific examples are aliphatic hydrocarbons such as hexane, heptane, octane, decane and kerosene. 4-Methyl-1-pentene may be used in excess to make it serve also as such a liquid medium. In the step [I] of this invention, a homo- or copolymer having a 4-methyl-1-pentene content of at least about 90% by weight is formed, and by utilizing the liquid medium mentioned above, the polymerization or copolymerization can be performed in slurry. Thus, the undesirable increase of the viscosity of the reaction system can be prevented, and the polymerization operation and the separation of the final 4-methyl-1-pentene copolymer composition can be effected easily.

The $C_6$–$C_{18}$ linear 1-olefin which may be included in an amount of up to about 10% in the 4-methyl-1-pentene copolymer obtained in step [I] includes, for example, 1-hexene, 1-octene, 1-decene, and 1-hexadecene.

The 4-methyl-1-pentene content of the copolymer formed in step [I] is at least about 90% by weight, preferably at least about 94% by weight. Preferably, the polymer or copolymer obtained in step [I] has an intrinsic viscosity (measured at 135° C. in decalin) of about 0.5 to 15, especially about 1 to about 7. To control the intrinsic viscosity of the polymer or copolymer, polymerization may be performed in the presence of a molecular weight control agent, preferably hydrogen.

Polymerization can be performed by means ordinarily used for polymerizing or copolymerizing olefins with Ziegler-type catalysts. It is carried out in the absence of a substantial amount of moisture and oxygen, for example in a nitrogen atmosphere. To perform stable slurry polymerization, the reaction temperature is for example, about 0° to about 150° C., preferably about 30° to about 100° C., and the polymerization pressure is atmospheric to about 20 $kg/cm^2$, preferably atmospheric to about 10 $kg/cm^2$.

To control the stereospecificity or molecular weight of the polymer or copolymer produced, the reaction may be carried out in the further presence of a $C_1$–$C_{18}$ alcohol such as methanol, ethanol, propanol, butanol, pentanol, hexanol, octanol or benzyl alcohol, a $C_2$–$C_{18}$ ester such as methyl formate, methyl acetate, ethyl acetate, vinyl acetate, ethyl chloroacetate, ethyl acrylate, ethyl benzoate and methyl p-toluate, a $C_3$–$C_{15}$ ketone such as acetone, methyl ethyl ketone, methyl isobutyl ketone, acetophenone and benzophenone, and a $C_2$–$C_{20}$ ether such as methyl ether, ethyl ether, n-butyl ether, tetrahydrofuran, anisole and diphenyl ether.

The amount of the catalyst used can be freely chosen. For example, the amount of the transition metal compound is about 0.001 to about 100 millimoles as metal atom, and the amount of the organometallic compound is about 0.1 to about 500 millimoles as metal atom, per liter of the hydrocarbon liquid medium. The mole ratio of the metal of the organo-metallic compound/the metal of the transition metal compound is preferably about 0.1 to about 100, more preferably about 1 to about 10.

In step [II] of the present invention, copolymerization is carried out in the presence of the reaction product containing the polymer or copolymer of 4-methyl-1-pentene produced in step [I].

The polymerization in accordance with this invention can be performed batchwise or continuously. In the batch process, the reactor is first charged with a solvent, catalyst and hydrogen. Then, predetermined amounts of 4-methyl-1-pentene and a $C_6$–$C_{18}$ linear 1-olefin are fed either at a time or continuously and polymerized for a predetermined period of time. Subsequently, predetermined amounts of 4-methyl-1-pentene, 1-hexene and a $C_7$–$C_{10}$ linear 1-olefin are introduced, and polymerized for a predetermined period of time. The polymerization is then stopped by adding an alcohol, for example. In the continuous process, a solvent, a catalyst, hydrogen and a first monomer are continuously fed into a first reactor, and the polymerization reaction mixture is continuously transferred into a second reactor. A second monomer is continuously fed into the second reactor, and the polymerization reaction mixture in the second reactor is continuously transferred into a catalyst decomposing tank.

The polymerization in step [II] results in a rubbery copolymer (B) having a 4-methyl-1-pentene content of about 30 to about 70% by weight, a 1-hexene content of about 10 to about 60% by weight, and a $C_7$–$C_{10}$ linear 1-olefin content of about 10 to about 60% by weight. In step [II], the three monomers are copolymerized in the presence of the rigid resin of 4-methyl-1-pentene polymer or copolymer (A) formed in step [II] thereby to form the rubbery copolymer (B).

Copolymerization in step [II] can be performed at the same temperatures and pressures as exemplified with regard to step [I]. Within the ranges illustrated for step [I], the same or different temperature and pressure conditions can be chosen. Following step [I], the slurry state is preferably retained in step [II] also. Better results are obtained in step [II] by not using hydrogen that can be used in step [I].

The copolymer composition thus obtained by the process of this invention comprising steps [I] and [II] has an intrinsic viscosity (measured at 135° C. in decalin) of 0.5 to 15, more preferably about 1 to about 7.

In the sequential copolymerization in steps [I] and [II] of this invention, the reaction can be performed under slurry polymerization or copolymerization conditions, and this can avoid an undesirable increase in the viscosity of the reaction mixture. The final product can therefore be obtained in the form of a slurry. The catalyst is deactivated in a customary manner by adding an alcohol such as methanol, ethanol, n-propanol, isopropanol or isobutanol, and then the solid 4-methyl-1-pentene copolymer composition can be separated and recovered by using known solid-liquid separating procedures such as centrifugal separation. It is not necessary at all to resort to a complicated and disadvantageous procedure of recovering the soluble polymer or copolymer that may be contained in the liquid phase, and combining it with the solid polymer so as to achieve improved impact strength.

The amount of the rubbery copolymer (B) formed in step [II] is about 5 to about 20% by weight based on the total weight of the polymer or copolymer (A) formed in step [I] and the rubbery copolymer (B). If this amount is larger than the specified limit, the resulting copolymer composition has very poor light transmittance, haze and resistance to whitening. If it is less than the specified limit, desired impact strength cannot be obtained. Accordingly, the reaction in step [II] must be performed so as to provide the above-specified amounts.

$C_7$–$C_{10}$ linear 1-olefins having 7 to 10 carbon atoms for use in step [II] are 1-heptene, 1-octene, 1-nonene and 1-decene.

The 4-methyl-1-pentene copolymer composition used obtained by the process of this invention substantially retains the light weight and transparency of poly 4-methyl-1-pentene and has improved impact strength and also superior resistances to whitening and to delamination which cannot be achieved by the prior art techniques. The improved copolymer composition of this invention, because of these improved characteristics, can find extensive use in the preparation of shaped articles such as impact-resistant transparent containers and bottles, impact-resistant transparent pipes and films for high temperature sterilization.

The copolymer compositions that can be provided by the process of this invention have a melting point of 200° to 240° C., an intrinsic viscosity, measured at 135° C. in decalin, of 0.5 to 15, a haze of 1.0 to 5.0%, a stress at yield point of 150 to 300 kg/cm$^2$, an impact strength, determined by a rod falling test at 5° C., of at least 100 kg.cm/cm$^2$, and a whitening resistance of at least 6 mm.

The following examples illustrate the process of the invention in more detail.

The properties of the 4-methyl-1-pentene copolymer composition are determined by the following methods.

(1) Content of the Rubbery Copolymer (B)

At the end of step [I], a part of the polymerization reaction mixture is collected, and the concentration of the polymer is measured to calculate the amount of the polymer formed at the end of step [I]. The value obtained is subtracted from the concentration of the final copolymer composition formed, and the result is defined as the content of the rubbery copolymer.

(2) Composition of the Rubbery Copolymer (B)

The proportion of the comonomer in the polymer or copolymer at the end of polymerization in step [I] and step [II] is measured by $C^{13}$-NMR, and the composition of the rubbery copolymer is calculated in accordance with the following equation.

$$[M]_B = \frac{[M]_o - [M]_A X_A}{X_B} \text{ (\% by weight)}$$

$X_A$: the weight fraction of component (A)
$X_B$: the weight fraction of component (B)
M: comonomer (e.g., 1-hexene)
$[M]_o$: the proportion of the comonomer in the entire copolymer composition
$[M]_A$: the proportion of comonomer M in component (A)
$[M]_B$: the proportion of comonomer M in component (B)

(3) Intrinsic Viscosity

Measured in decalin at 135° C.

(4) Stress at Yield Point

ASTM D638-68

(5) Izod Impact Strength

ASTM D256

(6) Impact Strength by a Rod Falling Test

A molded plate with a thickness of 2 mm is maintained at a predetermined temperature, and a rod of a given load having a tip with a curvature of radius of 5 mm is let fall onto the center of the molded plate from a height of 70 cm. The load is varied, and the impact energy value on the verge of 50% breakage of the molded plate is measured, and defined as the impact strength.

(7) Haze

ASTM D1746-62T (8) Resistance to Whitening

A 3 mm thick molded plate is bended at a speed of 100 mm/min. using a device designated in ASTM D790-66. The moving distance of the loading nose which causes whitening in the molded plate is measured, and defined as resistance to whitening.

(9) Resistance to Delamination

A IV-type dumbbell sample in accordance with ASTM D638-68 is injection-molded. The test sample is bended, and visually evaluated.

EXAMPLE 1

A 3-liter polymerization reactor was fully dried, and a nitrogen gas was passed to evacuate the air in it. The reactor was then charged with 1.5 liters of n-decane as a solvent, 13.3 millimoles of titanium trichloride and 26.6 millimoles of diethylaluminum chloride as a catalyst and 1.2 liters of hydrogen. The mixture was stirred, and maintained at 50° C. 500 g of 4-methyl-1-pentene was fed into the reactor maintained at 50° C. over the course of 90 minutes. The polymerization was continued for 4 hours. Then, a mixture of 37.5 g of 4-methyl-1-pentene, 31.3 g of 1-hexene and 31.3 g of 1-decene was fed at a time, and the polymerization was continued at 50° C. for 4 hours. Then, 90 ml of isobutanol was added to stop the polymerization. The resulting slurry was stirred at 50° C. for 15 minutes. The copolymer was separated by filtration in a nitrogen atomosphere, and mixed with stirring with 1.2 liters of n-decane containing 5% by volume of isobutanol at 50° C. for 30 minutes, followed by filtration. This operation was repeated four times, and the product was dried to separate 510 g of a white powdery copolymer.

The content of the rubbery copolymer (B) was 13% by weight. The copolymer (B) contained 32.6% by weight of 1-hexene and 20.7% by weight of 1-decene.

To the resulting powdery copolymer were added 0.12% by weight of tetrakis[methylene-3-(3′,5′-di-t-butyl-4′-hydroxyphenyl)propionate]methane, 0.05% by weight of 2,6-di-t-butyl-p-cresol and 0.03% by weight of calcium stearate. The mixture was pelletized at 280° C., and then injection-molded at 280° C. The properties of the injection-molded articles were determined, and the results are shown in Table 1.

EXAMPLES 2 TO 4 AND COMPARATIVE EXAMPLES 1 TO 4

The procedure of Example 1 was repeated except that the first and second monomers were changed as shown in Table 1. The properties of the resulting copolymers are shown in Table 1.

EXAMPLE 5

The procedure of Example 1 was repeated except that as a catalyst, 0.1 millimole, as titanium, of a catalyst component prepared by the method described below, and 3 millimoles of triethyl aluminum were used together with 1 millimole of methyl p-toluate.

Preparation of the Titanium Catalyst Component

Anhydrous magnesium chloride (20 g), 4.6 ml of ethyl benzoate and 3.0 ml of methylpolysiloxane (having a viscosity of 20 centipoises at 25° C.) were charged in an atmosphere of nitrogen into a stainless steel (SUS-32) ball mill cylinder having an inner capacity of 800 ml and an inside diameter of 100 mm and containing 2.8 kg of stainless steel (SUS-32) balls with a diameter of 15 mm. They were contacted with one another for 100 hours at an impact acceleration of 7.8G. Ten grams of the resulting solid treated product was suspended in 100 ml of titanium tetrachloride, and the suspension was stirred at 80° C. for 2 hours. The solid ingredient was collected by filtration, and washed with purified hexane until no free titanium tetrachloride was detected in the wash liquid. The washed product was dried to afford a complex containing titanium, magnesium and halogen. This complex contained 2.0% by weight of titanium, 66.0% by weight of chlorine and 6.5% by weight of ethyl benzoate and had a surface area of 200 m$^2$/g.

COMPARATIVE EXAMPLE 5

A fully dried, nitrogen-purged polymerization reactor (5 liters in capacity) was charged with 1.5 liters of n-decane as a solvent and 13.3 millimoles of titanium trichloride and 26.6 millimoles of diethylaluminum chloride as a catalyst. The mixture was stirred and maintained at 50° C. A mixture of 37.5 g of 4-methyl-1-pentene, 31.3 g of 1-hexene and 31.3 g of 1-decene was fed at a time, and the polymerization was performed at 50° C. for 4 hours. Since the polymerization reaction mixture became very viscous to make its stirring difficult, 1.5 liters of n-decane was further added.

Then, 1.2 liters of hydrogen was fed at a time, and 500 g of 4-methyl-1-pentene was fed into the polymerization reactor kept at 50° C. over the course of 90 minutes. Then, the polymerization was continued for 4 hours. Then, 90 ml of isobutanol was added to stop the polymerization. The reaction mixture was worked up in the same way as in Example 1 to afford a copolymer. The properties of the copolymer are shown in Table 1.

COMPARATIVE EXAMPLE 6

In the procedure of Example 1, the first-step polymerization and the second-step polymerization were performed separately. The rubbery component (B) was frozen and pulverized, and mixed with the powdery polymer component (A) at a (B):(A) weight ratio of 10:90. The mixture was pelletized in a pelletizer (20 mm φ), and molded into a press sheet. The properties of the press sheet are shown in Table 1.

Table 1

| Comonomer in step [I] (wt.%) | Comonomer in step [II] (wt.%) | Proportion of the rubbery component (B) in the copolymer composition (wt.%) | Intrinsic viscosity of the copolymer composition [η] |
| --- | --- | --- | --- |

Table 1-continued

| | | | | |
|---|---|---|---|---|
| Example 1 | — | 1-hexene (31), 1-decene (31) | 13 | 2.50 |
| 2 | 1-hexene (3) | 1-hexene (31), 1-decene (31) | 12 | 2.57 |
| 3 | 1-decene (6) | 1-hexene (31), 1-decene (31) | 12 | 2.64 |
| 4 | 1-hexene (6) | 1-hexene (31), 1-octene (16), 1-decene (16) | 11 | 2.53 |
| 5 | — | 1-hexene (31), 1-decene (31) | 10 | 2.71 |
| Comparative Example 1 | 1-hexene (6) | 1-hexene (62) | 12 | 2.70 |
| 2 | 1-octene (6) | 1-octene (62) | 12 | 2.69 |
| 3 | 1-decene (6) | 1-decene (62) | 11 | 2.55 |
| 4 | 1-octadecene (6) | 1-octadecene (62) | 10 | 2.63 |
| 5 | 1-hexene (31) 1-decene (31) | — | — | 2.53 |
| 6 | — | 1-hexene (31), 1-decene (31) | 10* | 2.56 |

*The proportion of the rubbery component in the mixture

| | Stress at yield point (kg/cm$^2$) 23° C | Izod impact strength (kg.cm/cm$^2$) notched, 23° C | Rod falling impact strength (kg.cm/cm) 5° C | Haze (%) | Resistance to whitening (mm) 23° C | Resistance to delamination |
|---|---|---|---|---|---|---|
| Example 1 | 260 | 2.7 | 300 | 1.3 | 8 | No |
| 2 | 230 | 2.8 | 350 | 1.5 | 9 | " |
| 3 | 210 | 3.0 | 420 | 1.6 | 10 | " |
| 4 | 215 | 2.9 | 420 | 1.7 | 10 | " |
| 5 | 250 | 2.6 | 350 | 1.4 | 9 | " |
| Comparative Example 1 | 215 | 2.0 | less than 10 | 1.0 | 15 | No |
| 2 | 210 | 2.2 | 50 | 2.9 | 8 | Yes |
| 3 | 210 | 3.0 | 420 | 3.8 | 5 | " |
| 4 | 205 | 2.8 | 420 | 6.8 | 3 | " |
| 5 | 270 | 2.0 | less than 10 | 1.1 | 12 | No |
| 6 | 260 | 2.8 | 100 | 3.8 | 5 | " |

EXAMPLE 7

A 200-liter polymerization reactor was fully dried, and purged with nitrogen to expel the air. The reactor was then charged with 90 liters of n-decane as a solvent, 0.80 mole of titanium trichloride and 1.60 moles of diethylaluminum chloride as a catalyst, and 72 liters of hydrogen. The mixture was stirred, and maintained at 50° C. A mixture of 28.2 kg of 4-methyl-1-pentene, 0.6 kg of 1-hexene, 0.6 kg of 1-octene and 0.6 kg of 1-decene was fed into the polymerization reactor at 50° C. over the course of 90 minutes. The polymerization was continued for 4 hours.

One cubic meter of nitrogen was passed at 50° C. through the vapor phase of the reactor over the course of 15 minutes, and a mixture of 2.25 kg of 4-methyl-1-pentene, 1.25 kg of 1-hexene, 1.25 kg of 1-octene and 1.25 kg of 1-decene was fed at a time. The polymerization was continued at 50° C. for 4 hours.

Then, 5.4 liters of isobutanol was added to stop the reaction. The resulting slurry was stirred at 50° C. for 15 minutes, and the resulting copolymer was separated by filtration in nitrogen. The copolymer separated was mixed with stirring with 72 liters of n-decane containing 5% by volume of isobutanol at 50° C. for 30 minutes, followed by filtration. The operation was repeated four times to separate a white powdery copolymer. The component (B) of the copolymer contained 25.0% by weight of 1-hexene, 12.3% by weight of 1-octene and 10.9% by weight of 1-decene.

To the resulting powdery copolymer were added 0.12% by weight of tetrakis-[methylene-3-(3',5'-di-tert-butyl-4'-hydroxyphenyl)propionate] methane, 0.05% by weight of 2,6-di-tert-butyl p-cresol, and 0.03% by weight of calcium stearate. The mixture was pelletized at 280° C., and injection-molded or blow-molded. The properties of the molded articles are shown in Table 2.

The blow-molded bottles were 400 ml. cylindrical bottles with a diameter of 56 mm and a height from the bottom to the shoulder of 150 mm, and had a unit weight of 30 g. The blow molding was performed by using a spider die while maintaining the resin temperature at 280° C. and the die temperature at 300° C.

COMPARATIVE EXAMPLES 7 TO 10

The procedure of Example 7 was repeated except that only 1-decene was used as a comonomer to be mixed with 4-methyl-1-pentene (Comparative Example 7) in steps [I] and [II]; 1-hexene was used as the first comonomer and 1-octene was used as the second comonomer (Comparative Example 8); a mixture of 97% by weight of 4-methyl-1-pentene and 3% by weight of 1-decene was polymerized in the first step using the same solvent and catalyst (Comparative Example 9); or a mixture of 90% by weight of 4-methyl-1-pentene and 10% by weight of 1-hexene was polymerized in the first step using the same solvent and catalyst (Comparative Example 10).

The results are also shown in Table 2.

Table 2

| | Example 7 | Comparative Example 7 | Comparative Example 8 | Comparative Example 9 | Comparative Example 10 |
|---|---|---|---|---|---|
| 1st step polymerization wt. % of 4-methyl-1-pentene | 94 | 97 | 94 | 97 | 90 |
| Comonomers | 1-hexene 1-octene 1-decene | 1-decene | 1-decene | 1-decene | 1-hexene |

Table 2-continued

|  | Example 7 | Comparative Example 7 | Comparative Example 8 | Comparative Example 9 | Comparative Example 10 |
| --- | --- | --- | --- | --- | --- |
| 2nd step polymerization wt. % of 4-methyl-1-pentene | 37.5 | 37.5 | 37.5 | — | — |
| Comonomers | 1-hexene 1-octene 1-decene | 1-decene | 1-octene | — | — |
| 1st monomer/2nd monomer feed ratio | 100/20 | 100/20 | 100/20 | 100/0 | 100/0 |
| Yield (kg) of powder | 30.5 | 31.6 | 30.2 | 28.7 | 24.6 |
| Total comonomer amount (wt. %) | 12.5 | 9.2 | 12.3 | 3.0 | 8.0 |
| Rubbery portion (B) Content (wt. %) | 13.6 | 12.6 | 13.0 | — | — |
| Comonomer proportion (wt. %) | 48.2 | 46.0 | 51.2 | — | — |
| Melt index of powder (5 kg, 260° C) | 4.56 | 10.6 | 5.7 | 4.6 | 5.0 |
| Intrinsic viscosity of the powder (in decalin at 135° C) | 2.71 | 2.50 | 2.68 | 2.69 | 2.67 |
| Melt index of pellets (5 kg, 260° C) | 8.1 | 12.0 | 10.3 | 6.8 | 6.0 |
| Stress at yield point (kg/cm$^2$) | 201 | 227 | 205 | 260 | 200 |
| Izod impact strength (notched, 23° C) (kg.cm/cm$^2$) | 3.3 | 2.9 | 2.3 | 2.0 | 2.0 |
| Rod-falling impact strength (kg.cm/cm) at 23° C | 420 | 420 | 420 | less than 10 | 30 |
| at 5° C | 260 | 280 | 40 | less than 10 | less than 10 |
| Resistance to whitening* | 10 | 3 | 8 | 15 | 17 |
| Blow-molded bottles Falling strength(m)** at 23° C | 4.1 | 4.5 | 4.0 | 0.2 | 0.2 |
| at 5° C | 1.3 | 1.0 | 0.2 | 0.1 | 0.1 |
| Appearance | Good | Roughened | Roughened | Good | Good |

*Same as in Table 1
**A 400 ml blow-molded bottle was filled with water to the full, and let fall with its bottom down. The height which resulted in the breakage of five bottles out of ten was measured, and defined as the falling strength.

What we claim is:

1. A process for producing a 4-methyl-1-pentene copolymer composition by sequential polymerization, which comprises
   [I] a step of polymerizing 4-methyl-1-pentene in the presence or absence of a minor amount of a $C_6$-$C_{18}$ linear 1-olefin in a hydrocarbon liquid medium in the presence of a catalyst comprising a transition metal compound and an organometallic compound of a metal of Groups I to III of the periodic table to form reaction product containing a 4-methyl-1-pentene polymer or copolymer (A) having a 4-methyl-1-pentene content of at least about 90% by weight; and
   [II] a step of further copolymerizing 4-methyl-1-pentene, 1-hexene and a $C_7$-$C_{10}$ linear 1-olefin in the presence of the reaction product containing the polymer or copolymer (A) to form a rubbery copolymer (B) having a 4-methyl-1-pentene content of about 30 to about 70% by weight, a 1-hexene content of about 10 to about 60 and a $C_7$-$C_{10}$ linear 1-olefin content of about 10 to about 60% by weight, the content of the copolymer (B) being about 5 to about 20% by weight based on the total weight of the polymer or copolymer (A) and the copolymer (B).

2. The process of claim 1 wherein the polymer or copolymer (A) formed in step [I] has an intrinsic viscosity, as measured in decalin at 135° C., of 0.5 to 15, and the 4-methyl-1-pentene copolymer composition formed by the combination of steps [I] and [II] has an intrinsic viscosity, measured in decalin at 135° C., of 0.5 to 15.

3. The process of claim 1 wherein the transition metal compound as a catalyst ingredient is a titanium compound, and the organometallic compound as a catalyst ingredient is an organoaluminum compound.

4. The process of claim 1 wherein the reactions in steps [I] and [II] are carried out at a temperature of about 0° C. to about 150° C. and a pressure of atmospheric pressure to about 20 kg/cm$^2$.

* * * * *